US008819078B2

(12) United States Patent
Roy et al.

(10) Patent No.: US 8,819,078 B2

(45) Date of Patent: Aug. 26, 2014

(54) EVENT PROCESSING FOR GRAPH-STRUCTURED DATA

(75) Inventors: Indrajit Roy, Mountain View, CA (US); Alvin AuYoung, San Jose, CA (US); Vanish Talwar, Campbell, CA (US); Michael Mihn-Jong Lee, La Jolla, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 123 days.

(21) Appl. No.: 13/549,112

(22) Filed: Jul. 13, 2012

(65) Prior Publication Data

US 2014/0019490 A1 Jan. 16, 2014

(51) Int. Cl.
*G06F 17/30* (2006.01)

(52) U.S. Cl.
CPC .... *G06F 17/30286* (2013.01); *G06F 17/30073* (2013.01)
USPC ........... 707/802; 707/803; 707/804; 707/805; 709/201; 709/203; 709/213; 709/217

(58) Field of Classification Search
CPC .................... G06F 17/30286; G06F 17/30073; G06F 17/30908
USPC ........... 707/802–805; 709/201, 203, 213, 217
See application file for complete search history.

(56) References Cited

U.S. PATENT DOCUMENTS 5,675,720 A * 10/1997 Sato et al. ..................... 345/419
5,819,210 A * 10/1998 Maxwell et al. .................. 704/9
5,974,254 A * 10/1999 Hsu .............................. 717/109
5,991,752 A * 11/1999 Fukuda et al. ........................ 1/1
6,064,953 A * 5/2000 Maxwell et al. .................. 704/9
6,138,270 A * 10/2000 Hsu .............................. 717/125
6,311,179 B1 * 10/2001 Agarwal et al. ....................... 1/1
6,317,735 B1 * 11/2001 Morimoto ..................... 707/694
6,477,515 B1 * 11/2002 Boroujerdi et al. ............ 706/14
6,633,886 B1 * 10/2003 Chong .......................... 707/798
6,711,577 B1 * 3/2004 Wong et al. ................... 707/694
6,985,890 B2 * 1/2006 Inokuchi ......................... 706/46
8,290,975 B2 * 10/2012 Gao et al. ...................... 707/767
8,321,430 B2 * 11/2012 Zvi et al. ....................... 707/754
8,375,061 B2 * 2/2013 Aggarwal ..................... 707/798
8,392,398 B2 * 3/2013 Aggarwal et al. ............. 707/713
8,452,108 B2 * 5/2013 Walch .......................... 382/203

(Continued)

OTHER PUBLICATIONS

Agarwal et al~"Scalable graph ecploration on multicore processors"~Proc 2010 ACM/IEEE Int'l Conf for High Performance Computing, Networking . . . ~2010~pp. 1-11.

(Continued)

*Primary Examiner* — Frantz Coby

(57) ABSTRACT

Examples of the present disclosure may include methods, systems, and computer readable media with executable instructions. An example method for event processing for graph-structured data can include storing graph structured data. The graph structured data includes a plurality of vertex, edge, and/or property graph elements. The example method further includes defining a first graph view of a characteristic of vertex, edge, and/or property graph elements. A subgraph is determined as a subset of the plurality of vertex, edge, and/or property graph elements that have the characteristic of vertex, edge, and/or property graph elements defined by the first graph view. The vertex, edge, and/or property graph elements of the subgraph are processed responsive to a predefined event that occurs on at least one of the vertex, edge, and/or property graph elements of the subgraph.

15 Claims, 4 Drawing Sheets

695

STORING GRAPH STRUCTURED DATA IN A DISTRIBUTED STORE ACROSS A PLURALITY OF COMPUTING DEVICES, THE GRAPH STRUCTURED DATA INCLUDING A PLURALITY OF VERTEX, EDGE, AND/OR PROPERTY GRAPH ELEMENTS — 696

DEFINING A FIRST GRAPH VIEW OF A CHARACTERISTIC OF VERTEX, EDGE, AND/OR PROPERTY GRAPH ELEMENTS — 697

DETERMINING A SUBGRAPH AS A SUBSET OF THE PLURALITY OF VERTEX, EDGE, AND/OR PROPERTY GRAPH ELEMENTS THAT HAVE THE CHARACTERISTIC OF VERTEX, EDGE, AND/OR PROPERTY GRAPH ELEMENTS DEFINED BY THE FIRST GRAPH VIEW — 698

PROCESSING THE VERTEX, EDGE, AND/OR PROPERTY GRAPH ELEMENTS OF THE SUBGRAPH RESPONSIVE TO A PREDEFINED EVENT THAT OCCURS ON AT LEAST ONE OF THE VERTEX, EDGE, AND/OR PROPERTY GRAPH ELEMENTS OF THE SUBGRAPH — 699

(56) References Cited

U.S. PATENT DOCUMENTS

| | | | | |
|---|---|---|---|---|
| 8,533,139 | B2 * | 9/2013 | Jamriška et al. | 706/45 |
| 2002/0174087 | A1 * | 11/2002 | Hao et al. | 707/1 |
| 2003/0225743 | A1 * | 12/2003 | Inokuchi | 707/3 |
| 2004/0093559 | A1 * | 5/2004 | Amaru et al. | 715/502 |
| 2005/0013490 | A1 * | 1/2005 | Rinne et al. | 382/226 |
| 2008/0154936 | A1 * | 6/2008 | Mihaila et al. | 707/102 |
| 2009/0234832 | A1 * | 9/2009 | Gao et al. | 707/5 |
| 2009/0303239 | A1 * | 12/2009 | Ang et al. | 345/440 |
| 2009/0324107 | A1 * | 12/2009 | Walch | 382/224 |
| 2010/0281071 | A1 * | 11/2010 | Ben-Zvi et al. | 707/803 |
| 2011/0154184 | A1 * | 6/2011 | Mihaila et al. | 715/234 |
| 2011/0302168 | A1 * | 12/2011 | Aggarwal | 707/739 |
| 2013/0016116 | A1 * | 1/2013 | Simon et al. | 345/589 |
| 2013/0060724 | A1 * | 3/2013 | Jamriska et al. | 706/45 |

OTHER PUBLICATIONS

Aguilera et al~"A practical scalable distributed b-tree"~PVLDB 1 ~ 2008~ pp. 598-609.

Aguilera et al~"Sinfonia: A new paradigm for building scalable distributed systems"~ACM Trans Comput Syst 27/3~2009~48 pages.

Fitzpatrick B~"Distributed caching with memcached"~Linux Journal ~2004~124/5~pages.

Geambasu et al~"Comet: An active distributed key-value store"~Proc of OSDI ~ 2010~14 pages.

Gregor et al~"The paralielbgl: A generic library for distributed graph computations"~Ir Parallel Object-Oriented Scientific Computing 2005 ~ 18 pages.

Knuth, D E ~The Art of Computer Programming, vol. 1: Fundamental Algorithms, 2nd Ediition ~ Addison-Wesley ~ 1973.

Kwon et al~"The components of congestion: delay from incidents, special events, lane closures, weather . . ."Proc 85th Meeting Transporation Research ~2006~18 pages.

Low et al "Graphlab:A new parallel framework for machine learning"~Conf on Uncertainty in Afrtifical Intelligences~Jul. 2010~10 pages.

Malewicz et al~"Pregel: A system for large -scale graph processing" in SIGMOD'10 ~2010 ~ pp. 135-146.

Miller, M et al~"An empirical analysis of the impact of incidents on freeway traffic"~Research paper ~ HPL-2011-124~Hewlett-Packard Company~2011~16 pages.

Montressor, A et al~"Distiburted k-core decomposition"~ Prc of 30th annual ACM SIGACT-SIGOPS~2011~PODC'11~pp. 207-208.

Newman, Mej et al~"Random graph models of social networks"~Proc of Nat'l Academy of Sciences of the USA 99~2002~pp. 2566-2572.

Pearce R et al~"Multi-threaded asynchronous graph traversal for in-memory and semi-external memory"~Proc of the 2010 ACM/IEEE Int'l Conf for High Performance Computing, Networking, Storage and Analysis ~ 2010 ~ pp. 1-11.

Riedel, E et al~"Active storage for large-scale data mining and multimedia applications"~Proc of the1998 Very Large Data Bases Conference~1998~pp. 20.

Sarwat, M et al~"Online query execution engine for large distributed graphs"~Proc 28th Int'l Conf on Data Engineering (ICDE)~2012~pp. 4.

Valiant, L G~"A bridging model for parallel computation"~Commun, ACM 33~1990~pp. 103-111.

Charles, et al., "X10: An Object-Oriented Approach to Non-Uniform Cluster Computing," in Object-Oriented Programming, Systems, Languages and Applications OOPSLA 2005, Oct. 16-20, 2005, 20 pages.

Huang, et al., "Scalable Sparql Querying of Large RDF Graphs," Proceedings of the Very Large Database Endowment PVLDB, vol. 4, Issue 21, Aug. 2011, 12 pages.

Iordanov, B., "Hypergraphdb: A Generalized Graph Database," in Proceedings of International Conference on Web-age Information Management, Jul. 15-17, 2010, 12 pages.

Karypis, et al., "Metis—unstructured graph partitioning and sparse matrix ordering system, version 2.0," Technical Report, Aug. 26, 1995, 16 pages.

Lattanzi, et al., "Filtering: A Method for Solving Graph Problems in Mapreduce," in SPAA 2011 Proceedings of the 23rd Annual ACM Symposium on Parallelism in Algorithms and Architectures, Jun. 4-6, 2011, 10 pages.

Martinez-Bazan, et al., "A high-performance graph database management system," Proceedings of the 16th ACM Conference on Information and Knowledge Management, CIKM 2007, Nov. 6-10, 2007, Libson, Portugal, pp. 573-582.

Mondal, et al., "Managing Large Dynamic Graphs Efficiently," in ACM International Conference on Management of Data, SIGMOD '12, May 20-24, 2012, 12 pages.

Nieplocha, et al., "Global Arrays: A nonuniform memory access programming model for high-performance computers," The Journal of Supercomputing, vol. 10, Issue 2, Jun. 1996, 17 pages.

Pujol, et al., "The Little Engine(s) That Could: Scaling Online Social Networks," in ACM Special Interest Groupon on Data Communication, SIGCOMM 2010, Aug. 30-Sep. 3, 2010, pp. 375-386.

Wang, et al., "Gnothi: Separating data and metadata for efficient and available storage replication," in USENIX Annual Technical Conference, Jun. 13-15, 2012, 12 pages.

Miller, Rich., "Facebook Now Has 30,000 Servers," Retrieved from http://www.datacenterknowledge.com/archives/2009/10/13/facebook-now-has-30000-servers/, Oct. 13, 2009, 17 pages.

Unknown., "HyperGraphDB," Retrieved from http://www.hypergraphdb.org/index, Jan. 20, 2012, 2 pages.

Unknown., "Sparsity Technologies: Why Dex, Why Graph Databases," Retrieved from http://www.sparsity-technologies.com/dex, Jan. 20, 2012, 2 pages.

Cowan, Lynn., "Zynga road show details disruptive business model," Retrieved from http://www.marketwatch.com/story/zynga-road-show-details-disruptive-business-model-2011-12-02, Dec. 2, 2011, 4 pages.

Infinite Graph, The Distributed Graph Database, Product Sheet (Release 2.0), Aug. 2011, 3 pgs.

Neo, the Neo Database AB—A Technologv introduction, Nov. 23, 2006, 8 pgs.

* cited by examiner

EVENT PROCESSING FOR GRAPH-STRUCTURED DATA

RELATED APPLICATIONS

The present disclosure is related to U.S. patent application Ser. No. 13/421,651, filed Mar. 15, 2012, entitled "DISTRIBUTED GRAPH STORAGE SYSTEM," and is incorporated by reference herein in its entirety.

BACKGROUND

A growing number of computer-implemented applications require low-latency and interactive processing over large, graph-structured data. Graph-structured data refers to a collection of vertices, e.g., nodes, and a collection of edges that relate pairs of vertices, and optionally, additional information that describes the vertices and/or edges. Graph-structured data can be used to describe a graph, and the graph can correspond to a network, e.g., a network of physical objects, people, etc. Examples of networks can include a social network or microblogging service where each member of the network is a graph vertex and the various relationships between the members are represented as graph edges. Another example is a road network where points of interests, e.g., cities, landmarks, intersections, are represented as vertices, and the roads connecting them as edges.

Events can occur on or within a network. Networks can experience a large number of events per unit time. For example, a popular social network can receive more than 200,000 events per second, e.g., new posts, message deliveries, queries, etc. Applications built upon such networks can be called upon to perform analysis based on the events occurring in the network. For example, in the case of the road network, an application might need to determine an impact region after a road incident has occurred. Efficient event processing on these graph-structured data can enable complex applications that require such event-processing to perform more timely and accurate analysis for complex events.

DETAILED DESCRIPTION

Figure 1:
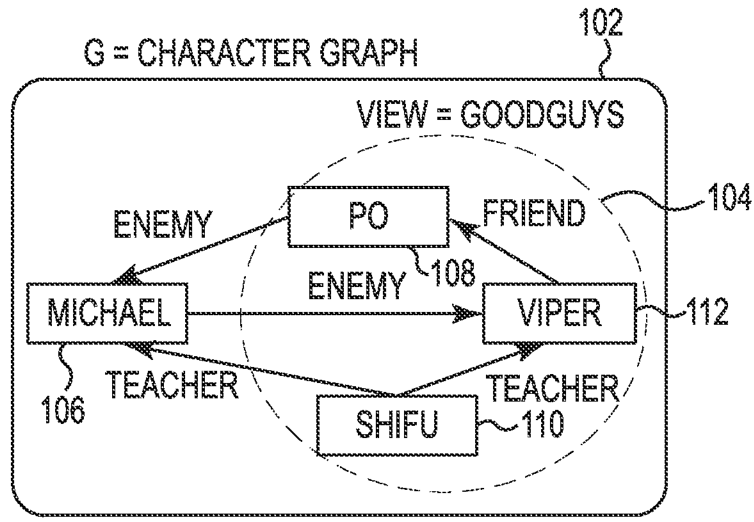
FIG. 1 illustrates an example relationship graph in accordance with one or more examples of the present disclosure.

Graph analysis is quickly emerging as a critical function in many domains. From social networks to biological networks to road traffic networks, a growing number of graph applications store and analyze graph-structured data. In many of these graph applications, new data is generated frequently, thus requiring high-throughput data ingestion. These graph applications are most useful when query results are up-to-date, or fresh. For example, Web-facing social networking applications are called upon to compute and deliver queries about friend updates, recommendations, or status posts in real-time. A method for event processing for these types of graph applications can involve high throughput of hundreds of thousands of requests/second and/or data latency in the range of milliseconds. For example, in order to be most useful, a graph corresponding to traffic on a road network should be capable of maintaining up-to-date and accurate information in near real time, including processing of events such as analysis of road incidents. An event is an operation or sequence of operations of interest that change a graph structurally, e.g., change a vertex and/or edge of the graph, and/or the properties, e.g., attributes, of a vertex and/or edge of the graph.

Since many of today's graph applications run on the critical path of an online workflow, it can be difficult to provide the desired query performance while also ingesting a high volume of updates. While relational databases and conventional data stores can be optimized to provide the desired data ingestion properties of the storage layer, they can be ill-suited for expressing graph algorithms, and can perform poorly on graph queries. For example, graph algorithms executing in conventional data stores can be an order of magnitude slower than graph algorithms executed in specialized graph stores.

Traditional relational databases are ubiquitous storage systems. However, traditional relational databases can be ill-suited for graph traversal queries because data is stored in table format and traditional relational databases can incur significant overhead, e.g., use of processing resources and time, of table joins. Traditional relational databases can support basic triggers that are mechanisms to start an analysis when an event occurs. However, traditional relational database triggers have not been used in the context of large graph stores and are not easily scaled for distributed storage systems, e.g., storage on multiple machines.

Previous graph store approaches, e.g., graph databases, can support transactional updates to data and support graph queries, and thereby improve query performance over traditional relational databases. However, it is believed that previous graph store approaches do not support graph views (or subgraph views), and do not support event-driven processing.

Previous graph store approaches such as batch graph analytics systems do not support low-latency, online graph queries. Some previous approaches of key-value data storage systems, which are neither relational databases or graph databases and support a simple put/get interface attempted to add intelligence to the storage infrastructure by co-locating compute capabilities to reduce the communication overhead of large-scale data mining applications, but like batch graph analytics systems, key-value data storage systems do not support low-latency, online graph queries. For example, one previous approach is an active distributed hash table (DHT) supporting sandboxed user-procedures at each DHT node. However, a DHT does not provide built-in support for graph management, parallel code execution, or concurrent updates.

Graph-analytics frameworks can be designed to analyze graphs in a more efficient and scalable manner than relational databases. However, this scale comes at the expense of data freshness and interactivity. Graph-analytics frameworks that optimize batch graph computation on top of a simple, scalable storage layer can operate based on an assumption that the data is largely read-only and/or updated infrequently.

For example, in an effort to meet desired query and storage performance, a previous approach graph application may use a tiered solution of a transactional or scalable storage backend, coupled with a fast caching layer to scale query performance with client request rate. However, tiered system approaches are particularly limiting for graph applications, since either the storage layer becomes the query bottleneck when performing on-demand complex graph computations, or the in-memory caching layer cannot guarantee transactional updates and freshness of query results.

Interactively querying for the k-hop neighbors of a user, or analysis using k-core with low latency, are two examples that can challenge achieving both query latency and throughput on the order of real-time interactive computation. At the scale of Web-facing client demand, some previous approach systems can compromise the freshness of the results by returning cached, pre-computed results. Other previous approach systems don't meet acceptable throughput and/or latency performance measures. Some differently-deployed instances attempt to meet cache pre-computed results, but some other previous approaches simply try to approximate the answer.

The event processing system of the present disclosure can provide event-driven processing over distributed, in-memory graph-structured data storage and graph views. Applications can register event handlers to be triggered automatically upon particular data updates of interest, which can reduce latency and/or computational overhead associated with a polling methodology.

The event processing for graph-structured data provided by an event processing system of the present disclosure provides graph views which allow applications or users to define subgraphs of interest. According to various embodiments, a graph view can be defined as a result of a graph query of the graph-structured data. Graph views can reduce the computation overhead on the system, for example, by limiting event handlers to the components, e.g., vertices and/or edges, of a subgraph. Graph views can also allow an application to provide information about which graph-structured data may be related, e.g., to a subgraph. In a distributed graph store, views can also be useful when performing data migration, partitioning, and/or load balancing.

The event processing for graph-structured data of the present disclosure also provides an interface and implementation of graph views, which allows a user to define a number of subgraphs of interest, monitor the defined subgraphs for occurrence of important events occurring in the subgraph, and to register analytics code to react to the events in order to achieve efficient implementation of event dispatch and the resulting analysis on the subgraph. The event processing system for graph-structured data of the present disclosure can provide flexibility to isolate subgraphs and specify events that are of interest, efficient asynchronous event processing and analysis over the graph in a distributed graph store, and better performance and easier-to-write applications than polling-based systems.

The event processing for graph-structured data of the present disclosure utilizes a graph store based on distributed, in-memory data structures. The event processing system can scale to hundreds of machines, or more, and provide concurrency-safe updates and parallel graph processing. The event processing system of the present disclosure is extensible and allows users to register functions on subgraphs and perform server side event-driven analysis.

The event processing system and distributed graph store can have the following properties: (1) support for low latency, interactive graph queries; (2) transactional semantics for fast and consistent updates; (3) distributed storage for scalability and parallel queries; and (4) server-side event driven processing. With these properties, the event processing system can be tailored to support a variety of graph applications without compromising data freshness or query complexity.

The event processing system of the present disclosure can utilize a distributed in-memory graph store with transactional semantics and server-side event processing. Graph views for event processing can extend the graph data store with dynamic partitioning and management mechanisms. The event processing system can have the following advantages over previous approaches: (1) flexibility to isolate subgraphs and specify events that are of interest; (2) efficient asynchronous event processing and analysis over the graph in a distributed store; and (3) better performance and easier to write applications compared to polling based systems.

FIG. 1 illustrates an example relationship graph 102 in accordance with one or more examples of the present disclosure. In contrast to relational databases, the event processing system of the present disclosure utilizes a data layout for graph-structured data by internally representing a graph as a set of vertex and edge objects (both of which can have associated properties). In order to support the implementation of a wide variety of applications, the event processing system enables applications to create views, which are subgraphs representing regions of interest within a data set.

The relationship graph 102 is a character graph (G) containing graph-structured data. Logically, an event processing system for graph-structured data can process the graph-structured data as a graph G=(V,E), where V is the set of vertices and E are the edges. To create graphs, the event processing system provides a graph class that consists of three basic data types: vertex, edge, and property. Together, the vertex, edge, and property data types can represent the graph-structured data. The relationship graph 102 includes a number of people represented in the relationship graph 102 as vertices 106, 108, 110, 112, and several relationships between the number of people represented in the relationship graph 102 as edges (shown as arrows).

FIG. 1 further shows a subgraph 104 corresponding to a view described as "goodguys." The event processing system of the present disclosure provides advanced functionality for handling events and subgraphs by creating views. Views are logical subgraphs and comprise of a list of vertices, edges and properties. Views are primarily created to isolate regions of interest (of the graph-structured data). In FIG. 1 the vertices Po, Viper and Shifu are part of the view called "goodguys." As such, subgraph 104 includes only a portion of the vertices of relationship graph 102. In a large traffic network, a view may be created that comprises only highways of one particular region, e.g., state, city, county, etc.

Views can be created as a result of graph queries. For example, a social network application may run a k-core routine to create a view of influential users. The event processing system can provide a view class to create and manage views. View class functions can be provided for modifying a view, such as for adding a graph element, e.g., vertex, edge, can be added to a view, or for merging two views, such as by a union of multiple views subtracting redundant common elements, or an intersection of multiple views retaining common elements. The view class functions are not limited to those provided here in example, and can include other common data set manipulations, e.g., union, intersection, etc.

The vertices can have an associated property. For example, vertex 106 corresponds to Michael, vertex 108 corresponds to Po, vertex 111 corresponds to Shifu, and vertex 112 corresponds to Viper. Likewise, the edges can also have an associated property. For example, the edges from vertex 106 to vertex 112, and from vertex 108 to vertex 106, each indicate an "enemy" relationship, the edges from vertex 110 to vertex 106, and from vertex 110 to vertex 112 each indicate a "teacher" relationship, and the edges from vertex 112 to vertex 108 indicates a "friend" relationship.

Figure 2:
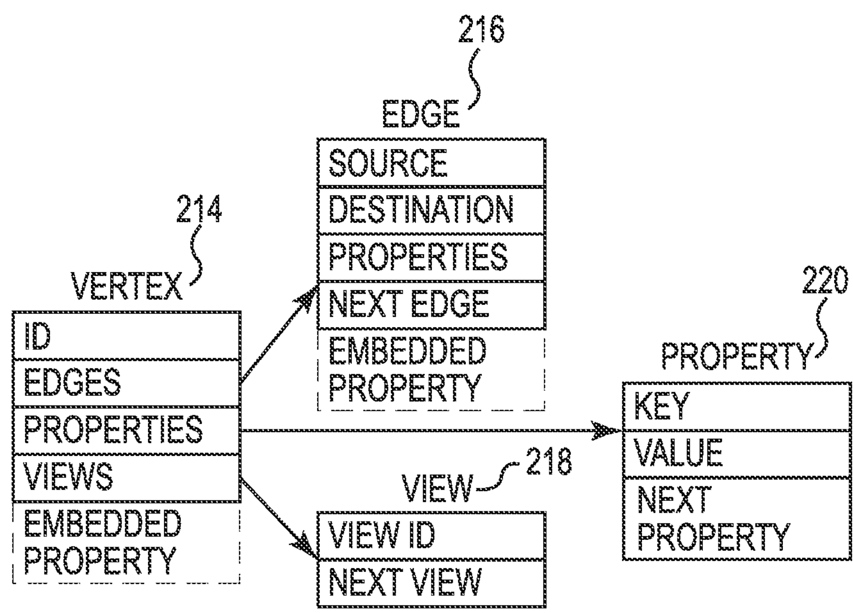
FIG. 2 illustrates an internal structure of a vertex in accordance with one or more examples of the present disclosure.

FIG. 2 illustrates an internal structure of a vertex in accordance with one or more examples of the present disclosure. Vertices, edges, and properties graph elements can be represented as records with pointers, as shown in FIG. 2 by vertex record 214, edge record 216, and property record 220. All the functions occur atomically and are safe in the presence of concurrent updates. A vertex record 214 can include, for example, identification information, edges information, properties information, views information, and optional embedded property information, among others.

An edge record 216 can include, for example, source information, destination information, properties information, next edge information, and optional embedded property information, among others. Edges represent the relationship between vertices, which are stored as properties of the edges.

A property record 220 can include, for example, key information, value information, and next property information, among others. Property graph elements can be attached to any vertex or edge, and stores associated data. Each property is stored as a key and value pair. Vertices and edges can have multiple properties. A property can be shared by multiple vertices or edges.

A vertex can have a pointer to the list of outgoing edges. An edge can have pointers to its source and destination vertices, and to the next edge of the source vertex. Thus, all outgoing edges of a vertex can be accessed one after the other starting from the first edge in the vertex.

Similarly, properties can also be chained together as a list. Both vertex and edge records can point to the head of their property list. Each graph element can also have a pointer to the list of views to which it belongs. A view can be defined by a view record 218, which can include a view identifier, and next view information, among others. View pointers can be used to trigger registered analytics code when an event occurs.

Figure 3:
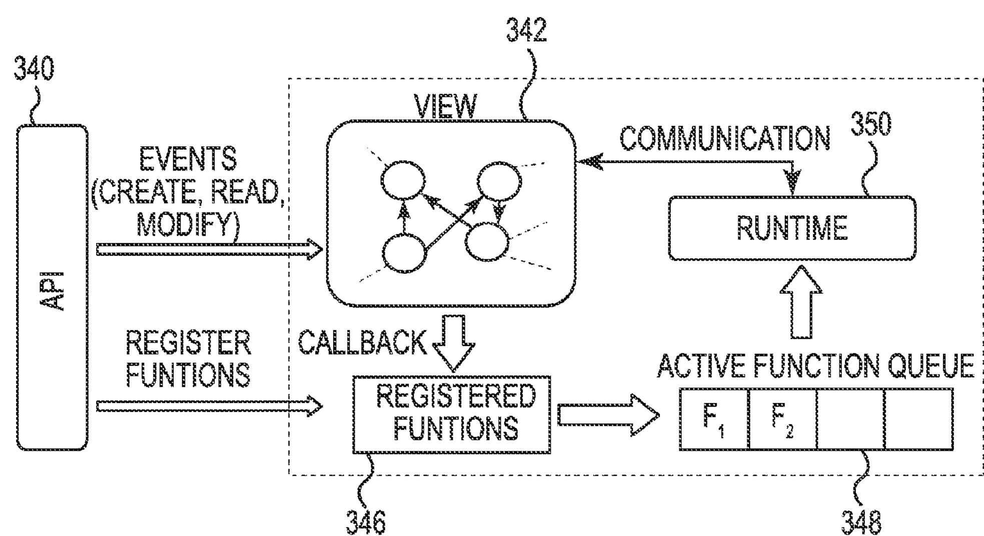
FIG. 3 illustrates control flow during event process at a view in accordance with one or more examples of the present disclosure.

FIG. 3 illustrates control flow during event process at a view 342 in accordance with one or more examples of the present disclosure. The event processing system of the present disclosure supports event-driven processing with views. The event processing for graph-structured data enables an application to extend the graph store's functionality by adding custom analysis functions to view 342 to handle events occurring in the store. These functions can include maintaining statistics, migrating data when workload hotspots occur, and finding impact regions after a traffic accident, for instance. View 342 can be stored as objects with pointers to all members of the view, as discussed above with respect to FIG. 2.

As mentioned, view 342 can also have a property list 346 to store the functions that need to be invoked when specified events occur. For example, properties can map function names to an actual function body. Then, whenever an event occurs in a view 342, a callback can be made to the property list 346 to invoke the corresponding registered function(s). The triggered functions can be loaded into the active function queue 348, and the event processing system runtime 350 can invoke the functions (triggered by the occurring event). The system runtime 350 is in communication with the view 342, which is the subject of the triggered functions when executed.

In many graph applications clients interactively navigate the graph and retrieve data associated with vertices. Such graph traversals can be accomplished using an API for querying vertices and their neighbors. Clients can use the API without worrying that the queries may be serviced by distributed servers which together store the data. Queries issued by client(s) may read or write data in the graph store. These queries can return immediately after completion. The queries may, however, asynchronously trigger in-graph-store analytics functions registered by the application using an application programming interface (API).

While clients can use a query API to implement even complex graph inquiries, such implementation can be inefficient. For example, to retrieve k-hop neighbors a client may recursively call get Neighbors on the vertices. This client-side processing can result in poor performance. Each query incurs the cost of a network roundtrip between the server and the client. In addition, clients don't benefit from parallelism unless they explicitly handle the complex concurrent state for each graph algorithm.

Therefore, the event processing system also supports parallel server side graph processing. The event processing system can execute distributed graph algorithms in phases. In each phase parallel computations can occur at the vertices followed by message exchange with other vertices. The process can terminate when all vertices vote to halt. Alternatively, a user can write distributed graph routines in the event processing system, which can become available as a new function call, and can be directly invoked by clients or executed when events occur in the graph data store.

In addition to the basic storage and query interfaces, the event processing system can also provide advanced functionality for handling events and subgraphs by creating views. As previously discussed with respect to FIG. 1, views are logical subgraphs that comprise of a list of vertices, edges and properties. Views are primarily created to isolate regions of interest. Views can be created as a result of graph queries.

Views allow arbitrary grouping of vertices. Thus, a vertex-centric program can be considered a special case where every vertex is a view. The view-centric approach provides the flexibility to tradeoff the computation and communication costs to improve performance. For graphs with millions of vertices, millions of messages may be generated in each phase due to vertex processing. The infrastructure incurs the overhead of communicating these messages and also of maintaining millions of vertex computations even though each computation is short lived.

By using views, intra-view communication is efficiently handled without the overhead of generating messages. Views can also reduce the number of independent computations that need to be maintained. However, unlike vertex based computations, the computation and the state for a group of vertices which form the view are specified. Additionally, views provide the flexibility to restrict a distributed computation to a subgraph instead of forcing full graph processing.

Views also support a capability to more efficiently perform event-driven processing. The event processing system can intercept events occurring on vertices, edges, and their properties in a view. Event-triggered functions can be invoked asynchronously after the event occurs, which reduces the performance effect on interactive queries. Within an invoked function the application has access to the graph element where the event occurred, and the code can also access the state of the view, i.e., graph elements that constitute the view and any data associated with the view.

FIG. 3 also illustrates implementation of an event-triggered process. API 340 can identify triggering events associated with a particular view 342, which can include creating a particular event, reading an event, and/or modifying an event. API 340 can also register functions, e.g., custom analysis functions, which are associated with one of the identified triggering events. The registered functions can be stored in property list 346.

Such asynchronous event processing by the event processing system of the present disclosure reduces the performance impact on the query throughput. Since the events of interest, e.g. updating a vertex, occur on a graph element, the event processing system runtime determines the corresponding function registered with the view. View members, such as vertices, can have a reverse pointer to their view object (FIG. 2). The reverse pointer can be used to reach the functions to be called after the event occurs at the graph element. The invoked functions are first appended to the active function queue 348.

These queued functions can be executed by a dedicated thread pool which provides coarse-grain performance isolation between queries and the event processing. During execution, these functions can use the event processing system runtime 350 for read access to elements of the view 342. For example, after a traffic accident occurs that affects information being obtained by a network road sensors, e.g., vertices, an analysis function to determine the impact of the accident on traffic, e.g., F1, may traverse the vertices in the view 342 to determine an affected region. The invoked functions can also store persistent data in the property fields of the view 342 for subsequent processing. For example, a monitoring function may store statistics about reads and writes as a property of the view.

Figure 4:
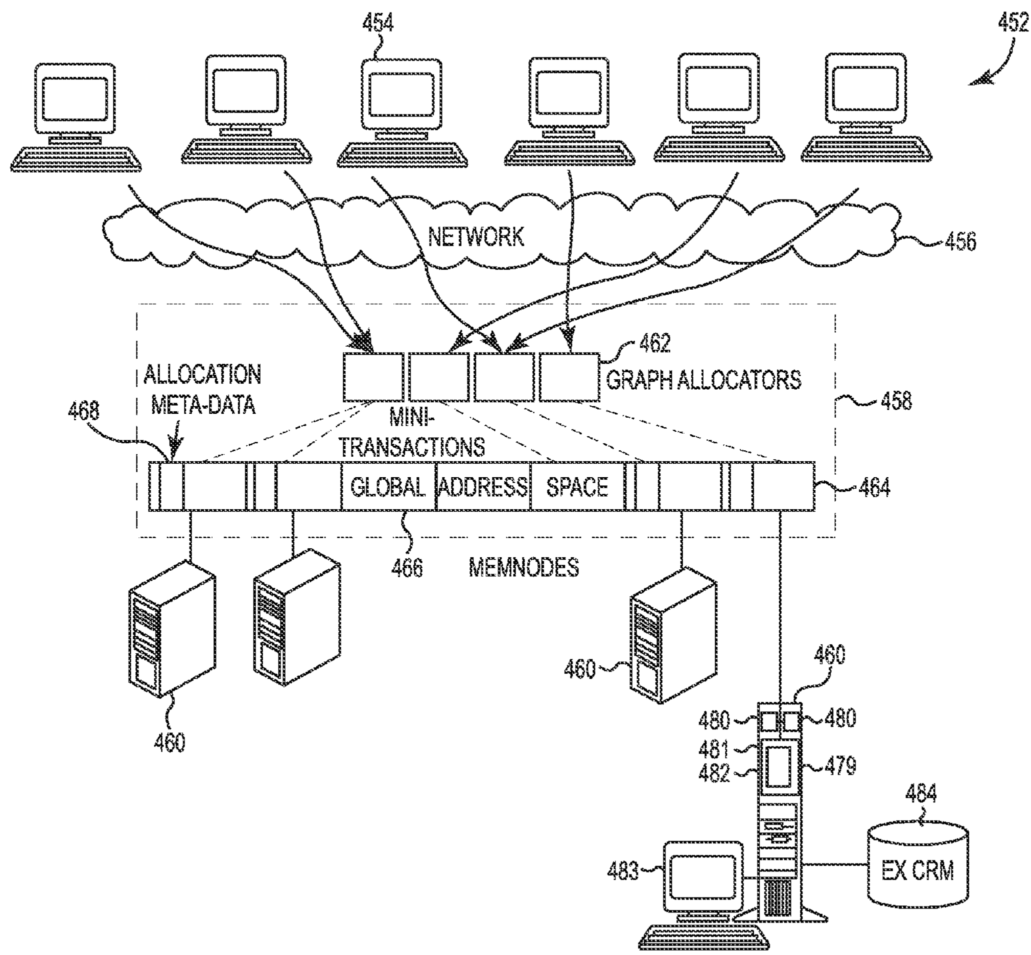
FIG. 4 illustrates a distributed graph allocation in accordance with one or more examples of the present disclosure.

FIG. 4 illustrates distributed graph allocation in accordance with one or more examples of the present disclosure. For scalability and load balance, the event processing system 452 of the present disclosure can store the graph-structured data across multiple machines, e.g., computing devices having processing resources. FIG. 4 shows the event processing system 452 including a number of clients 454 communicatively coupled through a network 456 to a cluster 458 of computing devices 460, e.g., servers.

A computing device 460 can have processing resources 480, an associated non-transitory computer-readable medium 479 storing executable instructions 482, one or more input/production devices 483, e.g., keyboard, electronic display, printer, etc., and/or can also be communicatively coupled to an external computer-readable memory 484. The computing device 460 can cause an output to the production device 483, for example, as a result of executing instructions 482 stored on the non-transitory computer-readable medium 479, by the processing resources 480, to implement the event processing of graph-structured data according to the present disclosure. Causing an output can include, but is not limited to, displaying text and images to an electronic display and/or printing text and images to a tangible medium (e.g., paper).

For seamless access across multiple machines, the event processing system 452 can use a global address space 466 that can be provided by a distributed shared memory implementation. According to various embodiments, the servers 460 in a cluster 458 are called memory nodes (memnodes). Each memnode can export a flat memory space 464 which can be combined to create a single global address space 466. The event processing system 452 can also use a distributed compare-and-swap like primitive called mini-transaction to access data.

Mini-transactions ensure that concurrent updates maintain consistency even in the presence of failures. Mini-transactions can optimize on a two-phase commit protocol to reduce network 456 round trips delays. Since mini-transactions are still a low level primitive, the more general transactional interface available on top of mini-transactions can be used to ensure transactional updates.

Whenever a request is made to create a graph element, e.g., vertex, edge, property, the event processing system library can initiate an allocation from the global address space 466 and assign a unique address to the graph element. These allocation requests can go through graph allocators 462.

The event processing system of the present disclosure can include capability to perform event-driven processing. Applications can, using a view API, define a number of subgraphs of interest, and register to be notified when events occur in the subgraph, as discussed with respect to FIG. 3. In a view, the event processing system can intercept an event occurring on vertices, edges, and/or respective properties included in the view. Applications can register to be notified of certain events, and can add optional analytics code to the view.

Applications can invoke their analytics code when events occur in the graph via an API. The API can intercept both read and write events. Read functions are useful for monitoring and gathering statistics. For example, an ONREADVERTEX (on read vertex) function can be used to determine whether too many clients are reading the view members leading to a hotspot. After monitoring the reads, data can be migrated to reduce hotspots. As an example of a write event, after a property has been updated, a ONUPDATEPROPERTY (on update property) can be invoked, which passes the handle to the property element and also the previous value which was replaced.

The graph layout of the present disclosure, including the capability to define subgraphs, has two major advantages over previous approaches. First, it is easy to migrate or replicate data, e.g., subgraphs, across machines while maintaining consistency. Migration can occur at the static block level or the property blocks. Second, the graph layout of the present disclosure improves the performance of traversals since the layout is compact. The vertex, edge, and/or property graph elements comprising a subgraph, i.e., the plurality of vertex, edge, and/or property graph elements that have a characteristic of vertex, edge, and/or property graph elements defined by a graph view, can be migrated, in total or in part, across machines of a distributed store in response to events to spread load or change graph partitioning for performance optimization.

The event processing system supports low-latency, interactive graph processing on up-to-date graph-structured data in several ways. First, the event processing system provides graph storage distributed in memory and queries with transactional semantics. Distributing the graph storage in memory allows the event processing system to scale performance with both the data set size and client request rate. Distribution allows the event processing system to support server-side processing of parallel graph routines, which removes unnecessary network roundtrip times between client and server during computation.

Distributed storage also allows the event processing system to handle dynamic workloads and changes in the cluster size by dynamically migrating internal data structures across servers. Applications can register event handlers to be triggered automatically upon particular data updates of interest. Similar to database triggers based on occurrence of events in a view, this functionality reduces unnecessary latency or computational overhead required from polling or similar techniques in building event-based or real-time applications.

The ability to define subgraphs of interest, as previously discussed, can reduce the computation overhead on the system, for example, by limiting event handlers to a subgraph, while also allowing an application to provide hints about which data may be related, which can be useful when performing migration or load balancing. The event processing system of the present disclosure can be approximately 10× faster in bulk insertion throughput, and 3-14× faster in interactive k-hop query performance, than some previous approaches.

The use of graph objects allows the graph-structured data to be distributed across machines to scale storage, balance client load, and support concurrent operations. Concurrent operations are particularly useful for supporting implementation of distributed graph algorithms, notably the Bulk Synchronous Parallel programming model.

The event processing system 452 can export an interface for server side processing of the distributed graph algorithms, e.g., k-hop, k-core, which can then be directly invoked by the clients 454. The transactional semantics also make it easier to migrate subgraphs online and across servers 460 when the cluster size changes or hotspots occur. By identifying subgraphs, the event processing system can act on application-specific knowledge for deciding how to migrate data when needed. The event processing system exposes an API for applications to register generic event handlers in support of those applications with real-time requirements.

The event processing system supports online migration of data across servers, which can be useful when new servers are added to the event processing system cluster or when workload hotspots occur on a server. Various functions can be used to move a vertex with all its outgoing edges and properties to a specified server, and/or move a subgraph to the specified server. These functions can be used with a monitoring data migration in the event processing system, which is an online operation to allow other non-conflicting operations to continue in the system.

Migration can be implemented as a series of tasks wrapped inside transactions. For example, when migrating a vertex, the vertex and all its associated data can be copied to the new server, the original copy can be deleted, and all incoming pointers to the vertex can be updated. For undirected graphs the information about incoming edges is available with the vertices since edges are bidirectional. However, for directed graphs the application can first create an index that maps vertices to their incoming edges.

The event processing system of the present disclosure, implementing graph views, event-based notifications, and server side processing, can be applied to various uses of graph-structured data, such as traffic impact analysis. The California Performance Measurement System (PeMS) is a network of road sensors spanning the major metropolitan freeways in California, and includes 26,000 sensors that collect data every 30 seconds, generating over 2 GB of data each day. In this example, the primary challenge isn't the scale of the data, but the real-time nature of the application.

An application of interest with respect to traffic impact analysis is a statistical technique to estimate the time and spatial impact of a road incident, e.g., an accident, obstruction, etc., on surrounding traffic. When an incident occurs, the application can react by analyzing the road network graph to predict the impact region. Low latency, e.g., fast analysis, is of great benefit so as to timely notify the appropriate authorities to respond.

For this graph-structured data example, the road sensors can be stored as vertices, and the connecting road segments can be stored as edges in a graph. Each vertex can contain information collected by its associated sensor, such as traffic flow, velocity, and/or external incidents (which can be uploaded from external sources). A specific geographic region of interest can be defined as a graph view, e.g., a municipality, so that a user associated with the geographic region may focus interest in the analysis of the geographic region when events occur.

As previously described, a function can be registered for the defined view to run the impact analysis routine upon occurrence of an incident. The analysis function can use the information contained in the sensors that are included the view. Embodiments of the present disclosure are not limited to one view, and the event processing system can be implemented with multiple views and corresponding functions. Event triggering of analysis function(s) is computationally more efficient than the polling and client side processing of previous approaches. The event processing system of the present disclosure can find an impacted region on the order of less than approximately 100 milliseconds, while a polling-based system may take from 1 to 10 seconds (based on a polling interval of the entire system of approximately 10 seconds). Even if the polling overheads are ignored, a poll-based system may take, on average, 1 second to complete the analysis because finding the impact region using client side graph traversal can be costly.

Figure 5:
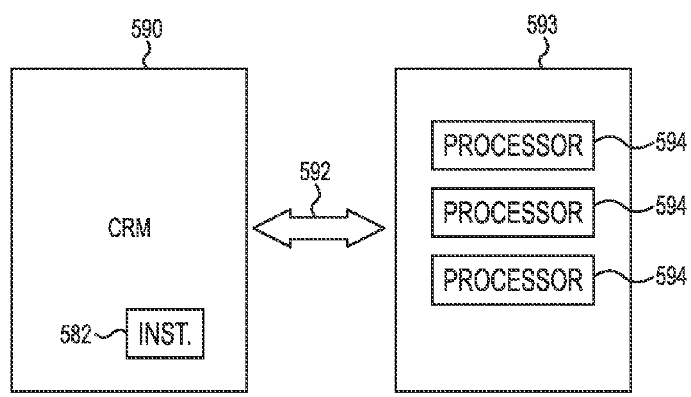
FIG. 5 illustrates a block diagram of an example of a computer-readable medium in communication with processing resources of a computing device in accordance with one or more examples of the present disclosure.

FIG. 5 illustrates a block diagram of an example of a computer-readable medium in communication with processing resources of a computing device in accordance with one or more examples of the present disclosure. A computing resource 593 can include processing resources 594 communicatively coupled to a computer readable medium (CRM) 590. The CRM 590 can be communicatively coupled with the processing resources 593 via a communication path 592. As used herein, processing resources 593 can include at least one processor, which can be arranged in a parallel processing arrangement. The CRM 590 can be a tangible non-transitory machine readable medium 595 storing a set of computer readable instructions 582, e.g., software, for implementing event processing for graph-structured data, as described herein. The CRM 590 can be configured include various modules.

The CRM 590 can include volatile and/or non-volatile memory. Volatile memory can include memory that depends upon power to store information, such as various types of dynamic random access memory (DRAM), among others. Non-volatile memory can include memory that does not depend upon power to store information, such as solid state media, e.g., flash memory, EEPROM, phase change random access memory (PCRAM), optical discs, digital video discs (DVD), Blu-ray discs, compact discs (CD), laser discs, and magnetic media such as tape drives, floppy discs, and hard drives, as well as other types of machine readable media. The CRM 590 can be an internal memory, a portable memory, a portable disk, or a memory located internal to another computing resource, e.g., enabling the computer-readable instructions 582 to be downloaded over the Internet.

A number of computing resources 594 can be used to implement the method(s) of the present disclosure, in whole or part. The event processing system of the present disclosure can be implemented using appropriately configured hardware and/or computer readable instructions 582. Various portions of the event processing system may be discretely implemented and/or implemented in a common arrangement.

Figure 6:
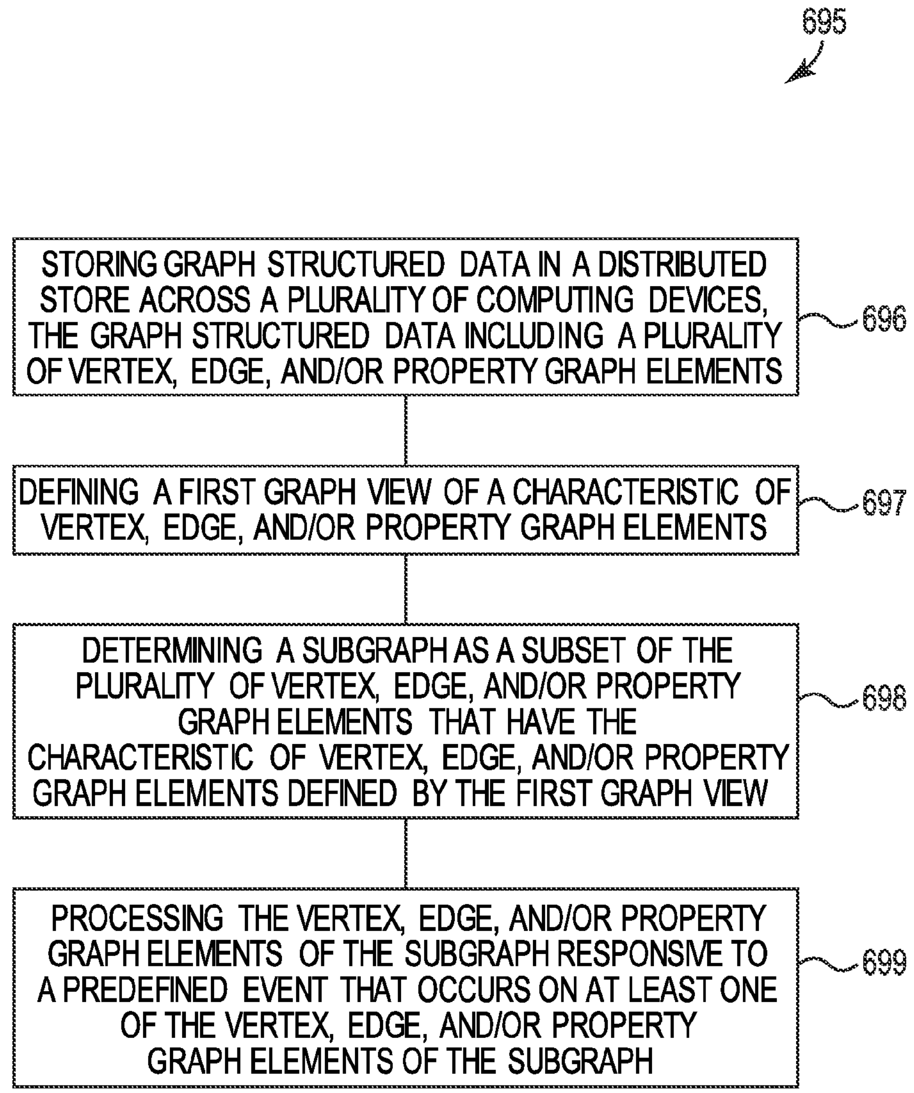
FIG. 6 illustrates a flow chart of an example method for event processing for graph-structured data in accordance with one or more examples of the present disclosure.

FIG. 6 illustrates a flow chart of an example method for event processing for graph-structured data in accordance with one or more examples of the present disclosure. The method for event processing for graph-structured data 695 can include storing graph structured data in a distributed store across a plurality of computing devices, the graph structured data including a plurality of vertex, edge, and/or property graph elements, as shown at 696, and defining a first graph view of a characteristic of vertex, edge, and/or property graph elements, as shown at 697. As indicated at 698, the method 695 further includes determining a subgraph as a subset of the plurality of vertex, edge, and/or property graph elements that have the characteristic of vertex, edge, and/or property graph elements defined by the first graph view. The vertex, edge, and/or property graph elements of the subgraph are processed responsive to a predefined event that occurs on at least one of the vertex, edge, and/or property graph elements of the subgraph, as shown at 699.

The method for event processing for graph-structured data can further include defining a second graph view having a different characteristic of vertex, edge, and/or property graph elements than the first graph view. A second subgraph can be determined as a subset of the plurality of graph elements that have the characteristic of vertex, edge, and/or property graph elements defined by the second graph view. The subgraph and the second subgraph can be combined into a composite subgraph. Redundant vertex, edge, and/or property graph elements can be removed from the composite subgraph that are common to each of the subgraph and the second subgraph, thereby providing a union of the two views. Alternatively, vertex, edge, and/or property graph elements that are not common to each of the subgraph and the second subgraph can be removed and vertex, edge, and/or property graph elements that are common to each of the subgraph and the second subgraph can be retained as the composite subgraph, thereby providing an intersection of the two views.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of one or more examples provided herein. The above description has been made in an illustrative fashion, and not a restrictive one. Combination of the above examples, and other examples not specifically described herein will be apparent upon reviewing the above description. Therefore, the scope of one or more examples of the present disclosure should be determined based on the appended claims, along with the full range of equivalents that are entitled.

Throughout the specification and claims, the meanings identified below do not necessarily limit the terms, but merely provide illustrative examples for the terms. The meaning of "a," "an," and "the" includes plural reference, and the meaning of "in" includes "in" and "on." "Example," as used herein, does not necessarily refer to the same example, although it may.

As used herein, the term "includes" means includes but not limited to, the term "including" means including but not limited to. The term "based on" means based at least in part on. The term "document," as used herein, includes but not limited to, electronic files such as web pages and word processing files, among others.

In the foregoing discussion of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of this disclosure.

Some features are grouped together in a single example for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed example. The following claims are hereby incorporated into the Detailed Description, with each claim standing on its own.

What is claimed:

1. A method of event processing for graph structured data, comprising:

storing graph-structured data in a store, the graph-structured data including a plurality of vertex, edge, and/or property graph elements;

defining a first graph view of a characteristic of vertex, edge, and/or property graph elements;

determining a subgraph as a subset of the plurality of vertex, edge, and/or property graph elements that have the characteristic of vertex, edge, and/or property graph elements defined by the first graph view; and processing the vertex, edge, and/or property graph elements of the subgraph responsive to a predefined event that occurs on at least one of the vertex, edge, and/or property graph elements of the subgraph.

2. The method of claim 1, wherein processing the vertex, edge, and/or property graph elements of the subgraph does not include processing those vertex, edge, and/or property graph elements not included in the subgraph responsive to the predefined event.

3. The method of claim 1, wherein defining the first graph view includes one of defining the first graph view as a result of a graph query of the graph-structured data or defining the first graph view as specified by a user.

4. The method of claim 1, wherein processing the vertex, edge, and/or property graph elements of the subgraph includes determining whether a particular one of the plurality of vertex, edge, and/or property graph elements is included in the first graph view using a central registry of views.

5. The method of claim 1, further comprising:

defining a second graph view, the second graph view having a different characteristic of vertex, edge, and/or property graph elements than the first graph view;

determining a second subgraph as a subset of the plurality of graph elements that have the characteristic of vertex, edge, and/or property graph elements defined by the second graph view;

combining the subgraph and the second subgraph into a composite subgraph; and removing the redundant vertex, edge, and/or property graph elements from the composite subgraph that are common to each of the subgraph and the second subgraph.

6. The method of claim 5, further comprising:

predefining an event associated with the at least one vertex, edge, and/or property graph element of the subgraph;

registering a function on a property list corresponding to the predefined event; and invoking the registered function corresponding to the predefined event responsive to occurrence of the predefined event;

wherein execution of the registered function is limited to the subgraph.

7. The method of claim 1, further comprising:

defining a second graph view, the second graph view having a different characteristic of vertex, edge, and/or property graph elements than the first graph view;

determining a second subgraph as a subset of the plurality of graph elements that have the characteristic of vertex, edge, and/or property graph elements defined by the second graph view;

combining the subgraph and the second subgraph into a composite subgraph, the subgraph including vertex, edge, and/or property graph elements common to each of the subgraph and the second subgraph; and removing the vertex, edge, and/or property graph elements from the composite subgraph that are not common to each of the subgraph and the second subgraph.

8. The method of claim 1, wherein storing graph-structured data includes storing each vertex, edge, and/or property graph element as an object on a respective one of the plurality of computing devices as a vertex, edge, and/or property record, wherein the vertex record refers to an edge record, a property record, and a view record corresponding to the first graph view.

9. The method of claim 1, wherein determining the subgraph includes determining the subgraph by an application, the method further comprising registering, by the application, to be notified when the predefined event occurs on at least one vertex, edge, and/or property graph element of the subgraph.

10. The method of claim 9, wherein processing the vertex, edge, and/or property graph elements of the subgraph responsive to the predefined event includes executing analytics code on the vertex, edge, and/or property graph elements of the subgraph and not executing analytics code on the vertex, edge, and/or property graph elements not included in the subgraph.

11. The method of claim 1, wherein defining the first graph view includes storing the graph view as an object with pointers to all vertex, edge, and/or property graph elements of the subset of the plurality of graph elements that have the characteristic of vertex, edge, and/or property graph elements defined by the first graph view.

12. The method of claim 1, wherein defining the first graph view includes storing as a property list a function to be invoked when the predefined event occurs on the vertex, edge, and/or property graph events of at least one vertex, edge, and/or property graph element of the subgraph.

13. The method of claim 1, wherein storing graph-structured data includes storing the graph-structured data in a distributed store across a plurality of computing devices, and the method further comprising migrating at least some of the subset of the plurality of vertex, edge, and/or property graph elements that have the characteristic of vertex, edge, and/or property graph elements defined by the first graph view across machines of the distributed store in response to events to spread load or change graph partitioning for performance optimization.

14. A non-transitory computer-readable medium storing a set of instructions executable by a processor to cause a plurality of computing devices to:

store graph-structured data in a distributed store across the plurality of computing devices, the graph-structured data including a plurality of vertex graph elements;

define a graph view based on a query of the store of graph-structured data;

determine a subgraph as a subset of the plurality of vertex graph elements corresponding to the graph view; and trigger a function that involves the graph elements of the subgraph responsive to occurrence of a predefined event that involves a graph element of the subgraph.

15. An event processing system, comprising:

a plurality of computing devices arranged in a cluster, each of the plurality of computing devices having a processing resource in communication with a non-transitory computer readable medium, wherein the non-transitory computer readable medium includes a set of instructions and wherein the processing resource executes the set of instructions to:

store graph-structured data in a distributed store across the plurality of computing devices, the graph-structured data including a plurality of vertex, edge, and/or property graph elements;

define a graph view having specified vertex, edge, and/or property graph element characteristics;

determine a subgraph as a subset of the plurality of vertex, edge, and/or property graph elements of the graph view; and invoke a function involving the vertex, edge, and/or property graph elements of the subgraph responsive to a predefined event, wherein the processing resource executes the set of instructions to process only the vertex, edge, and/or property graph elements of the subgraph responsive to the predefined event where the predefined event occurs on at least one of the vertex, edge, and/or property graph element of the subgraph.

* * * * *